United States Patent [19]

Weaver et al.

[11] 4,063,939

[45] Dec. 20, 1977

[54] COMPOSITE TURBINE WHEEL AND PROCESS FOR MAKING SAME

[75] Inventors: Don M. Weaver, Birmingham; Steven H. Reichman, Ann Arbor, both of Mich.

[73] Assignee: Special Metals Corporation, New Hartford, N.Y.

[21] Appl. No.: 590,797

[22] Filed: June 27, 1975

[51] Int. Cl.$^2$ .......................... B22F 3/12; B22F 3/14; B22F 5/04

[52] U.S. Cl. .................................. 75/208 R; 75/226; 75/221; 29/156.8 R; 29/156.8 B; 29/420.5; 75/200

[58] Field of Search .................... 29/156.8 R, 156.8 B, 29/420, 420.5, DIG. 31; 75/208 R, 226, 221, 200; 416/213, 219, 234, 241, 241 B

[56] References Cited

U.S. PATENT DOCUMENTS

| | | | |
|---|---|---|---|
| 2,431,660 | 11/1947 | Gaudenzi | 416/241 B |
| 2,757,446 | 8/1956 | Boegehold et al. | 29/156.8 B |
| 2,769,611 | 11/1956 | Schwarzkopf | 416/241 B |
| 2,894,318 | 7/1959 | Bloomberg | 29/156.8 R |
| 2,941,933 | 6/1960 | Roake et al. | 29/420 |
| 3,655,458 | 4/1972 | Reichman | 75/226 |
| 3,684,498 | 8/1972 | Heck | 75/208 |
| 3,761,257 | 9/1973 | Dunn | 29/420.5 |
| 3,803,702 | 4/1974 | Bratt et al. | 29/420.5 |
| 3,837,068 | 9/1974 | Dunn | 29/420.5 |
| 3,844,778 | 10/1974 | Malone et al. | 75/208 R |
| 3,888,663 | 6/1975 | Reichman | 75/221 |
| 3,940,268 | 2/1976 | Catlin | 29/156.8 R |

*Primary Examiner*—C. W. Lanham
*Assistant Examiner*—Daniel C. Crane
*Attorney, Agent, or Firm*—Harness, Dickey & Pierce

[57] ABSTRACT

A process for making a composite integral turbine wheel and the like, consisting of a plurality of blade elements of an airfoil shape connected at their inner ends to the periphery of a sintered rotor or hub and metallurgically bonded thereto. In accordance with the practice of the process, a plurality of identical blade elements in a final machined condition are inserted in a mold at accurate circumferentially-spaced intervals therearound and are disposed such that the inner root sections thereof extend inwardly of a mold cavity defining the rotor profile. The mold cavity is filled with metal powder composed of a high-strength, temperature-resistant alloy, and sintered into a coherent mass in a manner to effect a metallurgical bonding of the sintered rotor section to the individual blade elements. The resultant integral assembly is thereafter isostatically pressed at an elevated temperature for a period of time to effect a further densification of the sintered rotor section to a density approaching 100 percent theoretical density.

15 Claims, 10 Drawing Figures

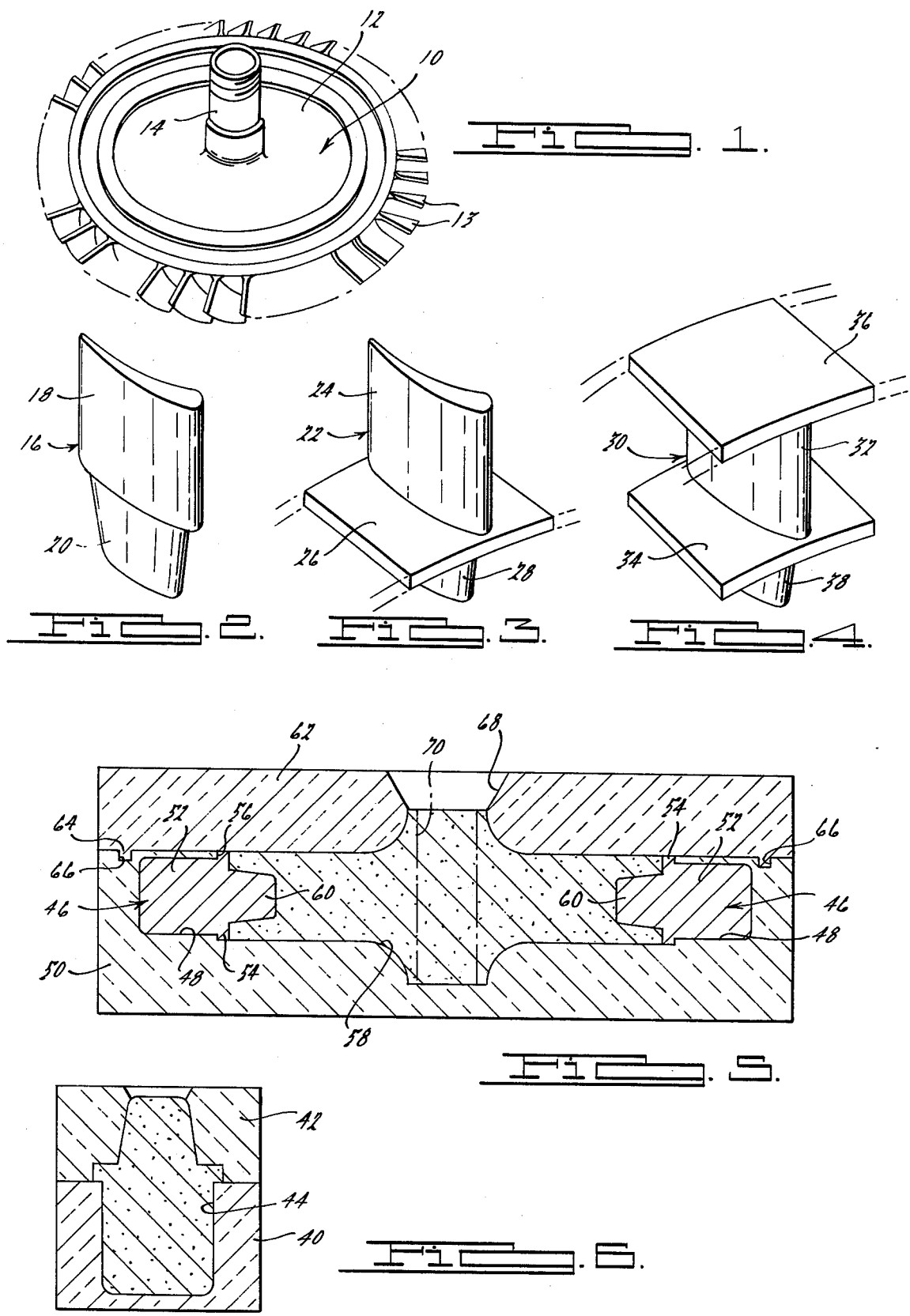

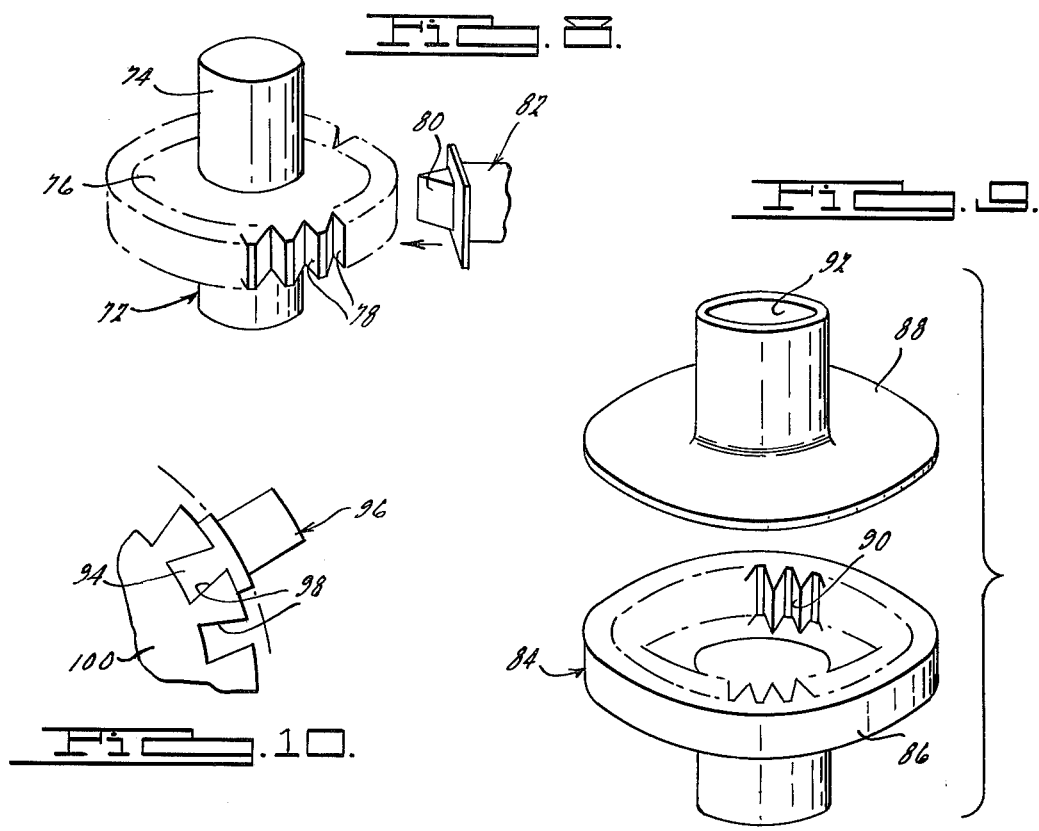
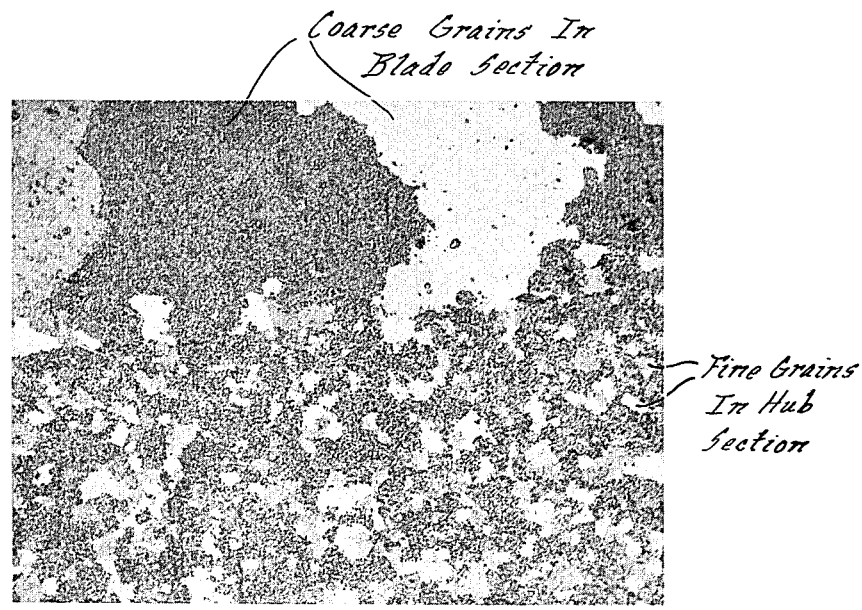

COMPOSITE TURBINE WHEEL AND PROCESS FOR MAKING SAME

BACKGROUND OF THE INVENTION

Various processing techniques have heretofore been proposed or used for manufacturing turbine wheels for use in gas turbine power plants of the types satisfactory for use in automobiles, buses, trucks, off-the-road earth-moving equipment, and the like. The manufacturing techniques employed in the fabrication of aircraft type gas turbine engines are exceedingly costly and are not applicable for the mass production of low-cost vehicle turbine power plants that are competitively priced with gasoline and deisel-fueled reciprocating internal combustion engines. The various prior art processing techniques heretofore proposed for fabricating gas turbine wheels have either been too costly or have produced turbine wheels which are of inadequate mechanical strength and/or durability, or are not adaptable to high volume mass production techniques.

As an example, it has heretofore been proposed to produce such turbine wheels as an integral casting of a high strength, high temperature alloy employing investment casting techniques. Unfortunately, the rate of solidification of such integrally-cast wheels results in an extremely fine-sized grain structure in the blade portions of the wheel and a macro-sized grain structure in the central portion of the hub or rotor which imparts brittleness and lack of toughness and strength in the hub portion, which during service is subjected to the highest stresses due to the centrifugal forces imposed on the turbine wheel. The fine-sized grain structure of the blades, on the other hand, prevents the attainment of optimum high temperature strength and fatigue resistance properties. In order to overcome the aforementioned problem, it has been suggested, such as in U.S. Pat. No. 2,894,318, to form composite turbine wheels by separately forming the blade elements and thereafter casting and integrally bonding the blade elements to a cast central hub or rotor. Alternatively, it has been suggested, such as in U.S. Pat. No. 3,032,864, to produce a composite turbine wheel by mechanically bonding a plurality of separately-formed blade elements to a separately-formed central hub section by a high temperature forging operation in which the hub section is deformed into mechanical interlocking relationship with the blade elements.

The foregoing and other prior art techniques heretofore proposed have been unsatisfactory for any one of a number of reasons and the process of the present invention overcomes the problems and disadvantages heretofore encountered, enabling the manufacture of composite turbine wheels of satisfactory strength and durability at commercially acceptable costs employing mass production techniques.

SUMMARY OF THE INVENTION

The benefits and advantages of the present invention are achieved by forming a plurality of identical blade elements consisting of an airfoil-shaped blade section having a root or tang integrally affixed to the base of the blade section and extending axially thereof. The blade elements are formed to accurate final dimensions and are comprised of high strength, temperature resistant materials such as superalloys, ceramics, and other equivalent materials. The blade elements are formed by casting, forging or sintering metal powders and thereafter are accurately machined to the desired final dimensional tolerances.

A mold or fixture is provided formed with a plurality of radially-extending circumferentially-spaced airfoil-shaped cavities for receiving the blade section of each blade element, effecting an accurate positioning thereof around a central mold cavity defining the profile of the hub or rotor of the turbine wheel. The root portions of the blade extend inwardly of the mold cavity, which thereupon is filled with a metal alloy powder possessed of the requisite strength and high temperature resistance properties. The metal alloy powder is loosely filled in the mold and packed so as to provide a density of at least about 65 percent, and preferably greater than about 70 of 100 percent theoretical density, whereafter the mold assembly is heated to an elevated temperature to effect a sintering of the metal powder into a coherent mass defining the hub and to simultaneously effect a metallurgical diffusion bonding of the sintered powder with the surfaces of the root sections of the blade elements. The sintering is performed so as to effect a further densification of the metal powder, preferably in excess of about 95 of 100 percent theoretical density.

At the completion of the sintering operation, the integral turbine wheel is removed from the mold and is subjected to hot isostatic pressing at a temperature generally within the range of the sintering temperature and at a pressure of at least about 1,000 psi, and preferably ranging from about 10,000 to about 20,000 psi, for a period of time sufficient to effect a further densification of the sintered hub section to a density approaching 100 percent theoretical density, and to effect a further diffusion bonding between the root sections and the sintered hub forming a high-strength metallurgical bond. The resultant composite turbine wheel can thereafter be machined to impart the desired dimensional tolerances to the rotor portion thereof and can be subjected to further heat treatments to optimize the mechanical properties thereof.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a perspective view of a typical composite turbine wheel produced in accordance with the practice of the present invention;

FIG. 2 is a perspective view of a plain-type blade element;

FIG. 3 is a perspective view of a blade element incorporating an arcuate platform section at the base thereof;

FIG. 4 is a perspective view of a blade element incorporating an arcuate platform at the base of the blade section, and an arcuate shroud section at the tip portion thereof;

FIG. 5 is a vertical transverse sectional view of a refractory mold having a plurality of blade elements assembled therein and the central cavity thereof filled with a metal powder preliminary to the sintering step;

FIG. 6 is a transverse sectional view of a refractory mold having a cavity defining a blade element filled with metal powder to be sintered;

FIG. 7 is a photomicrograph of the metallurgical bond formed between the root section of the blade elements and the sintered densified hub section;

FIG. 8 is an exploded perspective view of an alternative embodiment of the present invention;

FIG. 9 is a perspective view of a mold for producing the sinter preform hub section shown in FIG. 8; and FIG. 10 is a fragmentary plan view of a blade section interlocked with the hub section.

DESCRIPTION OF THE PREFERRED EMBODIMENTS

Referring now in detail to the drawing and as shown in FIG. 1, a typical turbine wheel 10 is illustrated comprised of a central rotor or hub section 12, to the periphery of which a plurality of blades 13 are affixed at accurate arcuate increments therealong. A suitable shaft 14 may be affixed to the center of the rotor for rotatably supporting the turbine wheel in a gas turbine engine. It will be appreciated that the practice of the present invention is also applicable for fabricating composite compressor wheels and other rotating components, whereby advantages are derived similar to those achieved in fabricating composite turbine wheels.

The composite turbine wheel comprises a plurality of individual blade elements which are separately formed by any one of a variety of techniques and are finished to the desired final accurate dimensions and surface finish. A plain-type blade element 16 is illustrated in FIG. 2 comprised of an airfoil-shaped blade section 18 having an integrally connected foot or root section 20 extending axially of the base of the blade section, which is adapted to become embedded within the hub of the turbine wheel to effect a secure anchoring of the blade element thereto. An alternative satisfactory blade element 22 is illustrated in FIG. 3 comprised of an airfoil-shaped blade section 24 and an arcuate-shaped platform 26 integrally affixed to the base of the blade section. The circumferential length of the arcuate platform 26 is controlled such that upon assembly of a plurality of the blade elements 22, a substantially continuous segmented ring (as fragmentarily indicated in phantom) is formed with the end of one platform disposed in opposed aligned relationship relative to the corresponding axial edge of the adjacent platform. It is also contemplated that the platform 26 can be of an arcuate length shorter than the spacing between adjacent blades, such that the gaps defined between the opposed axially extending edges of adjacent blade elements is filled with the material of which the hub section is comprised. As in the case of the blade element 16, shown in FIG. 2, the blade element 22 is also formed with a root section 28 extending axially of the base of the blade section and platform for anchoring the blade element in the hub section of a turbine wheel.

Still another alternative satisfactory blade element 30 is illustrated in FIG. 4, which is comprised of an airfoil-shaped blade section 32 having an arcuate platform 34 affixed to the base of the blade section, and an arcuate shroud 36 affixed to the tip of the blade section. The circumferential or arcuate length of the shroud section is controlled such that upon assembly of a plurality of blade elements, the axially extending opposed edges of adjacent shroud elements (as fragmentarily indicated in phantom) are disposed in abutting relationship and define, in combination, a continuous segmented ring extending around in periphery of the blade sections. The blade element 30 is also provided with an integrally-formed axially-extending root section 38 for anchoring the blade element to the hub section of the turbine wheel.

The blade elements, as typically shown in FIGS. 2–4, may be comprised of any high-strength heat-resistant material which is of the requisite high temperature mechanical strength and oxidation and corrosion-resistant properties consistent with the stress-temperature environment to which the blades are to be subjected during service. While ceramic compositions such as silicon nitride, silicon carbide, alumina, and the like and cermet compositions of various types known in the art can be employed in some applications, the blade elements are preferably comprised of so-called superalloys of which nickel-base superalloys are preferred and are generally characterized as normally having carbide strengthening and gamma-prime strengthening in their cast and wrought forms. Such nickel-base superalloys conventionally contain relatively large quantities of second phase gamma-prime and complex carbides in a nickel-chromium gamma matrix which contributes to their excellent high temperature mechanical properties, rendering them eminently suitable for fabricating the blade elements which are exposed to the hot combustion gases during the operation of the gas turbine engines. Typical nominal compositions of a series of commercially available nickel-based superalloys are set forth in Table 1.

TABLE 1

| Alloy | C | Cr | Al | Ti | Mo | W | Co | Cb | B | Zr | Fe | V | Ni | Other |
|---|---|---|---|---|---|---|---|---|---|---|---|---|---|---|
| Nimonic 75 | 0.12 | 20 | — | 0.5 | — | — | — | — | — | — | — | — | Bal. | — |
| Nimonic 80A | 0.08 | 20 | 1.5 | 2.4 | — | — | — | — | — | — | — | — | Bal. | — |
| Nimonic 90 | 0.10 | 20 | 1.6 | 2.4 | — | — | 17.5 | — | — | — | — | — | Bal. | — |
| Nimonic 95 | 0.12 | 20 | 2.0 | 3.0 | — | — | 17.5 | — | — | — | — | — | Bal. | — |
| Nimonic 100 | 0.20 | 11 | 5.0 | 1.3 | 5.0 | — | 20.0 | — | — | — | — | — | Bal. | — |
| Waspaloy | 0.08 | 19 | 1.3 | 3.0 | 4.4 | — | 13.5 | — | 0.008 | 0.08 | — | — | Bal. | — |
| Udimet 700 | 0.10 | 15 | 4.3 | 3.5 | 5.2 | — | 18.5 | — | 0.03 | — | — | — | Bal. | — |
| Rene 41 | 0.09 | 19 | 1.5 | 3.1 | 10.0 | — | 11.0 | — | 0.005 | — | — | — | Bal. | — |
| IN-100 (cast) | 0.18 | 10 | 5.5 | 5.0 | 3.0 | — | 15.0 | — | 0.015 | 0.05 | — | — | Bal. | — |
| MAR-M200 (cast) | 0.15 | 9.0 | 5.0 | 2.0 | — | 12.5 | — | 1.0 | 0.015 | 0.05 | — | — | Bal. | — |
| B-1900 (cast) | 0.11 | 8.0 | 6.0 | 1.0 | 6.0 | — | 10.0 | — | 0.015 | 0.07 | — | — | Bal. | 4.3 Ta |
| INCO-713 (cast) | 0.14 | 13.0 | 6.0 | 0.75 | 4.5 | — | — | 2.3 Cb+Ta | 0.0 | 0.1 | — | — | Bal. | — |
| M-252 | 0.15 | 19.0 | 1.0 | 2.5 | 9.8 | — | 10.0 | — | 0.005 | — | 5.0 (max) | — | Bal. | — |
| IN-792 | 0.15 | 12.5 | 3.5 | 4.0 | 2.0 | 4.0 | 9.0 | — | — | 0.15 | 0.5 (max) | — | Bal. | 1.0 Hf |

The individual blade elements can be individually formed either by investment casting techniques, by forging rough cast elements, by employing powder metallurgical techniques, or combinations of the foregoing. Since grain size and microstructure of the superalloys determines their high temperature mechanical properties, it is usually desirable and preferred to fabricate the blade elements so as to be of a comparatively large grain size, providing thereby optimum high temperature strength and fatigue resistance. Large grain size can be achieved by investment casting of superalloys employing refractory molds having shaped cavities corresponding to the accurate final dimensions of the blade element. It is also contemplated that the individual blade elements can be formed by sintering superalloy powders under controlled conditions, whereby densities approaching 100 percent theoretical density of the sintered blade elements is obtained. Blade elements produced by powder metallurgical sintering techniques are generally characterized as being of a relatively fine grain size corresponding generally to the size of the original powder particles.

FIG. 6 is illustrative of a two-piece refractory mold comprising a lower section 40 and an upper section 42 defining in combination a cavity 44 having a profile or configuration corresponding to the blade element 22 shown in FIG. 3. The cavity 44 is adapted to be filled with a metal powder of the desired composition and the mold is preferably vibrated, such as by employing supersonic vibratory devices, to effect a loose powder packing density of at least about 65 of 100 percent theoretical density, and preferably densities of from 70 up to about 75 percent of 100 percent theoretical density. The powder-filled mold thereafter is sintered at an elevated temperature in a controlled environment under conditions subsequently to be described in greater detail. The mold arrangement shown in FIG. 6 is also typical of one suitable for casting blade elements utilizing molten high temperature alloys which upon solidification are removed and finish machined to the desired final dimensions and surface finish.

It is also contemplated that the blade elements may be comprised of cast blade sections, such as the section 18 indicated in FIG. 2, to which a sintered root section 20 is secured by means of an elevated temperature sintering operation. This enables the formation of a cast or wrought blade section employing investment casting techniques with or without subsequent forging operations independently of the root section. The root section subsequently can be affixed to the blade section by a high-strength metallurgical diffusion bond during an elevated sintering operation under conditions similar to those employed in the sintering of the hub section shown in FIG. 5, or in producing a metal powder sintered blade element in a mold as illustrated in FIG. 6.

A powder metallurgical technique for forming the blade elements which is particularly satisfactory is one as described in U.S. Pat. No. 3,655,458, which also is assigned to the assignee of the present invention and the subject matter of which is incorporated herein by reference. In accordance with the process as disclosed in the aforementioned United States patent, a superalloy powder containing less than about 200 ppm oxygen and a maximum of about 700 ppm carbon is densified at an elevated temperature into a preform approaching 100 percent theoretical density. The billet possesses superplastic behavior and can be further deformed to provide the desired airfoil section and accurately profiled root section of the blade element, such as by hot forging, for example; whereafter to forged blade element is subjected to a heat treatment at an elevated temperature for a period of time sufficient to effect a grain growth of the alloy to a grain size at which optimum high temperature physical properties including strength and fatigue resistance are achieved. Thereafter, the blade elements are subjected to a carburization treatment in a manner to effect a controlled increase in their carbon content to a level of at least about 500 ppm up to about 2000 ppm or greater, whereby a stabilization of the large grain structure of the blade elements is achieved. The carburization treatment is carried out in a manner so as to promote carbide formation preferentially at the grain boundaries rather than in the gamma matrix so as to deter further grain growth. Thereafter, the blade elements preferably are subjected to a solution annealing treatment to enhance the homogeneity thereof.

Referring now to FIG. 5, a plurality of the finished blade elements, indicated at 46, are inserted in circumferentially-spaced radially-extending airfoil-shaped cavities 48 provided in a lower mold section 50, whereby the blade sections 52 are accurately positioned in appropriate registration relative to the rotor section to be formed. Each of the blade elements 46 is disposed such that an arcuate platform section 54 thereof is disposed in abutting relationship against the circumferential surface 56 of a circular mold cavity 58 defining the profile of the hub section to be formed, and whereby the root sections 60 of each blade element extend radially inwardly of the mold cavity 58. An upper refractory mold section 62 is positioned in appropriate registration relative to the upper surface of the lower mold section 50, which is facilitated by cooperating indexing projections 64 on the lower surface of the upper mold section which are slidably received in corresponding shaped apertures 66 in the lower mold half. A pouring port 68 is formed in the central portion of the upper mold section, through which metal powder of the desired composition can be introduced into the mold cavity 58.

The metal powder, indicated at 70, is introduced in a manner so as to substantially completely fill the mold cavity and to effect an embedment of the root section 60 of each of the individual blade elements within the metal powder effecting an anchoring of the blade elements during the subsequent sintering step. As in the case of the fabrication of blade elements employing powder metallurgical techniques, the metal powder within the mold cavity is preferably supersonically vibrated to provide a loose powder packing density of at least about 65 percent, and preferably from about 70 to about 75 percent of 100 percent theoretical density. In this connection, metal powders which are of an average particle size ranging from about 1 micron up to about 250 microns, and preferably from about 10 microns to about 150 microns, can be satisfactorily employed. It is also preferred that the powder particles are distributed over this size range to maximize their packing density.

When employing nickel-based superalloy powders for the formation of the hub section, as well as for producing individual sintered blade elements, it is important, in order to achieve satisfactory mechanical properties, that the oxygen content of the metal powder is less than about 200 parts per million (ppm) and preferably less than about 100 ppm. Superalloy powders of the desired particle size and degree of purity can be conveniently and efficiently produced by any one of a variety of known processing techniques, of which the microcasting of a molten mass of the metal alloy by inert gas atomization constitutes a preferred method. An apparatus suitable for this purpose is described in U.S. Pat. No. 3,253,783, which is assigned to the same assignee as the present invention and the teachings of which are incorporated herein by reference. Inasmuch as nickel-base superalloys of the types enumerated in Table 1 conventionally contain appreciable quantities of aluminum and titanium as alloying constituents, the high reactivity of these two elements and their propensity to react with oxygen at the high temperatures at which the microcasting operation is performed requires the use of vacuum or inert gas atmospheres in the atomization and collection chambers to minimize contamination of the powder product with oxide. The presence of such oxides in amounts generally above about 200 ppm detracts from attaining optimum physical properties of the resultant sintered and densified components produced therefrom. Particularly satisfactory results are obtained employing helium or commerically available argon inert gases in the atomization, collection and classification chambers, providing therewith metal powders of an average particle size less than 250 microns, and preferably powders which are distributed over a range of about 10 microns up to about 150 microns, and containing less than about 100 ppm oxygen.

Referring now to FIGS. 5 and 6, the mold cavities for the hub section, as shown in FIG. 5, and the blade element, as shown in FIG. 6, are filled with powder of the desired composition preparatory to the sintering operation. As previously mentioned, the filling operation is performed so as to maximize the density of the powder, which generally will range from about 65 percent to as high as 75 percent of 100 percent theoretical density. The loose packing density of the powder can be maximized by subjecting the molds and the powder content to sonic or supersonic vibration during and after the filling operation. The powder-filled molds thereafter are placed in a sintering furnace and heated to an elevated temperature for a period of time sufficient to effect a diffusion bonding of the individual powder particles to each other and to the root sections 60 of the blade elements forming a coherent mass which is accompanied by a further densification of the powder to a density of at least about 90 percent, and preferably about 95 percent or more of 100 percent theoretical density. The particular temperature, environment and duration of the sintering operation will vary depending upon the specific type and composition of the metal powder employed. In the case of nickel-base superalloy powders of the types enumerated in Table 1, a single stage sintering of the powder can be performed at temperatures generally ranging from about 2000° F up to a temperature below the incipient melting point of the alloy, and preferably from about 2200° F to about 2300° F, in vacuum, for a period of about one to about 24 hours, and in a manner to effect an abnormally high densification of the powder during the sintering step so as to attain a sintered mass of at least 90 percent, and preferably of at least about 95 percent of 100 percent density. The sintering temperature employed is controlled within the upper range of permissible temperatures normally employed for sintering superalloy powders in order to effect a maximum densification of the powder during the sintering operation.

It is also contemplated that in lieu of a one-stage sintering operation, a two-stage sintering operation of nickel-based superalloy powders can be employed in accordance with the technique as described in United States patent application Ser. No. 301,433, filed Oct. 27, 1972, for "Metal Powder Sintering Process", now U.S. Pat. No. 3,888,663. The substance of the aforementioned patent is incorporated herein by reference. Briefly stated, the process as therein described employs a first low temperature sintering stage performed in a vacuum at a temperature ranging from about 1600° F to about 2000° F, which is conducive for effecting a conversion of the primary carbides in the powder particles to complex carbides and to initiate a diffusion bonding and neck formation between the powder particles at their points of contact. Thereafter, the preliminarily sintered mass is heated to a second sintering temperature above the first sintering temperature up to a level below the incipient melting point of the powder particles for a period of time to effect further growth of the necks and the formation of an integral sintered mass.

At the conclusion of the sintering operation, the composite turbine wheel, after cooling, is removed from the mold and inspected prior to the hot isostatic pressing operation for effecting a further densification thereof and a further enhancement of the bonding between the metal powder rotor portion and the root sections embedded therein. It is also contemplated that at this stage, preliminary machining of the hub section can be performed as may be desired, such as, for example, the boring of an axial aperture through the center of the hub as indicated in phantom at 70 in FIG. 5. The provision of a through-bore 70 in the rotor section of the turbine wheel enables an assembly operation to be performed during the subsequent hot isostatic pressing step, such as, for example, by inserting the shank end of a shaft, such as the shaft 14 shown in FIG. 1, into the bore, which becomes sintered and metallurgically bonded to the rotor section during the high temperature isostatic pressing operation. The shaft itself may be comprised of a high-strenth nickel-base alloy of a forged or wrought structure which is preliminarily machined to dimensions approaching final dimensions and may further be provided with splines or other machined grooves in the shank portion thereof to effect a mechanical interlock with corresponding projections along the length of the through-bore, thereby further enhancing the strength of the composite assembly.

The hot isostatic pressing operation is carried out employing a pressure vessel or autoclave which can be pressurized employing a fluid, such as argon, of commercial quality to apply a pressure equally over the entire surface area of the composite assembly. The pressure, in combination with the elevated temperature employed, effects a further consolidation and densification of the sintered hub section to a density approaching 100 percent theoretical density. Pressures suitable for use in the hot isostatic pressing may range from as low as about 1,000 psi to as high as is possible in consideration of the strength limitations of the autoclave employed. Conventionally, pressures from about 10,000 to about 20,000 psi are preferred. The temperature employed in the hot isostatic pressing step is similar to those employed during the sintering operation and will vary depending upon the specific composition of the metal powder used in fabricating the hub section. For nickel-base superalloy powders of the type enumerated in Table 1, temperatures generally ranging from about 1900° F up to about the incipient melting point of the metal alloy can be empolyed, while temperatures ranging from about 2000° F to about 2300° F are preferred.

The duration of the hot isostatic pressing step will vary depending upon the temperature employed, the pressure employed and the density of the sintered hub. Generally, time periods of about one hour up to about ten hours at pressures ranging from about 10,000 psi to about 20,000 psi at temperatures ranging from about 2000° F to about 2300° F are satisfactory for effecting a densification of a porous sintered hub section of 95 percent theoretical density to a final pressed density in excess of 99 percent and approaching 100 percent theoretical density.

At the conclusion of the hot isostatic pressing step, the composite turbine wheel is cooled and removed, and thereafter is final machined and balanced to within the required tolerances.

During the single or multiple sintering step, as well as during the hot isostatic pressing step, a high-strength uniform metallurgical diffusion bond is formed between the surfaces of the root sections 60 of the blade elements and the metal powder comprising the hub section. The resultant metallurgical diffusion bond formed is characterized as not appreciably indicating a line of demarcation between the root section surface and the powder layer comprising the hub section, but rather a uniform transformation of grain structure characteristic of an integral assembly. A photomicrograph of a typical metallurgical diffusion bond formed between the sintered hub section and the surface of the root sections is illustrated in FIG. 7. The micrograph is taken at a magnification of 100 times and is illustrative of the metallurgical diffusion bond obtained between a coarse-grained cast blade section composed of IN 792 (upper half of photomicrograph) and the fine-grained powder metallurgical hub section composed of IN 792 (lower half of photomicrograph). FIG. 7 reveals no distinct bond line and further shows some evidence of grain growth across the interface produced during the sintering and subsequent hot isostatic pressing operations.

In accordance with the foregoing process, the grain size of the blade sections can be increased to a size so as to provide optimum strength and fatigue resistance while the grain size of the hub or rotor section can be maintained at a relatively fine grain size generally corresponding to the size of the initial powder particles employed in forming the hub section. In this manner, the macro grain structure of the blade sections provides optimum high temperature performance of the blades, while the extremely fine-sized grain structure of the hub section provides optimum strength and toughness necessary to withstand the higher stresses and lower temperatures to which the hub section is subject during service, thereby providing optimum performance. The composite turbine wheel, accordingly, is tailored in alloy composition and grain structure to optimize its mechanical properties, while at the same time providing the most efficient utitization of materials, maximizing economy of the composite assembly. In contrast, integrally cast turbine wheels of the types heretofore known in accordance with prior art practices result in turbine wheels having extremely fine grain size in the blade section, providing inadequate high temperature strength and fatigue resistance, while the central hub section, due to the differential cooling and solidification rates, is of a macro grain structure, contributing toward brittleness and lack of toughness and strength in the region of highest stress.

It is also contemplated, in accordance with the practice of the present invention, that the rotor or hub section itself can be preformed by preliminarily sintering the metal powder of which it is comprised in a mold and the resultant preform can thereafter be assembled with the blade sections, after which a further sintering and subsequent hot isostatic pressing produces an integral turbine wheel assembly. As shown in FIG. 8, a preformed hub or wheel section 72 comprises a central shaft section 74 and a disc section 76, the periphery of which is formed with a plurality of axially extending notches 78 disposed at accurately spaced circumferential locations therearound, which are adapted to slidably receive and accurately locate the root portion 80 of a blade element 82.

The preformed hub section 72 is composed of the same powder compositions as previously described and is produced by employing a mold assembly 84 as illustrated in FIG. 9. The mold assembly 84 comprises a lower mold section 86 and an upper mold section 88 which upon assembly defines an internal mold cavity 90 of a configuration corresponding substantially to the preformed hub section 72.

The internal mold cavity 90 is filled through a port 92 in the central upper end of the upper mold section 88 in a manner as previously described so as to obtain a loose powder packing density of at least about 65 percent and preferably 70 percent or greater of 100 percent theoretical density. The powder is subsequently sintered in the same manner as previously described for producing the blade elements and integral turbine assembly providing a presintered preform having a density of at least about 85 percent theoretical density and preferably from about 90 up to about 95 percent of theoretical density. The preform is subsequently assembled with the requisite number of blade elements 82 as shown in FIG. 8 whereby the coaction between the root portions and notches 78 serve to accurately retain the blade elements in appropriate radial and circumferential registration around the periphery of the disc section 76. The resultant assembly is subjected to a further sintering operation under the same conditions as previously described, so as to form a metallurgical diffusion bond between the preform and the blade elements. The resultant sintered assembly is thereafter hot isostatically pressed in the same manner as previously described to produce an integral turbine wheel approaching 100 percent of theoretical density and wherein the blades are integrally bonded to the hub section by a metallurgical bond similar to that previously described in connection with FIG. 7.

It is also contemplated, as shown in FIG. 10, that a root section 94 of a blade element 96 can be of a dovetail configuration so as to form a mechanical interlock with correspondingly contoured notches 98 in the disc section 100 of a preformed hub section. The provision of such a mechanical interlock between the blade elements and the preformed hub section further enhances the integrity of the final hot isostatically pressed assembly and also minimizes or substantially reduces the complexity of the fixtures required to retain or support the hub section and blade elements during the final sintering operation without incurring any misalignment of the blade elements relative to the hub section.

While it will be apparent that the invention here described is well calculated to achieve the benefits and advantages hereinabove set forth, it will be appreciated that the invention is susceptible to modification, variation and change without departing from the spirit thereof.

What is claimed is:

1. A process for making a composite turbine wheel or the like comprising a plurality of blades connected to the periphery of a hub which comprises the steps of forming a plurality of blade elements composed of a high temperature strength and fatigue resistant material including a blade section having an integrally-connected root section extending axially of the base of said blade section, finishing said blade elements to accurate final dimensions, positioning said blade elements in a mold in radially-oriented accurately-spaced circumferential relationship with said root sections thereof extending inwardly of a mold cavity defining the profile of the hub of said turbine wheel, filling said mold cavity with a superalloy metal powder of a particle size less than about 100 mesh and an oxygen content of less than about 200 ppm in a manner to achieve a loose powder packing density of at least about 60 percent of theoretical 100 percent density and effecting an embedment of said root sections in said metal powder, heating said mold and the assembled said blade elements and said metal powder in vacuum to an elevated temperature to effect a sintering of said metal powder into a coherent mass and a bonding thereof to said root sections, continuing said heating and sintering until the sintered said powder attains a density of at least about 90 of 100 percent theoretical density and to form a metallurgical diffusion bond between said root sections and the sintered said metal powder forming an integral assembly, and thereafter hot isostatically pressing said integral assembly at an elevated temperature under sufficient pressure for a period of time to effect a further densification of the sintered said powder defining the hub to a density approaching 100 percent of theoretical density.

2. The process as defined in claim 1 in which the step of filling said mold cavity is performed in a manner to achieve a loose powder packing density of at least about 70 percent of theoretical density.

3. The process as defined in claim 1 in which the step of continuing said heating and sintering is performed until the sintered said powder attains a density of at least about 95 percent of theoretical density.

4. The process as defined in claim 1 in which the step of filling said mold cavity is performed by employing a superalloy metal powder of an oxygen content of less than about 100 ppm.

5. The process as defined in claim 1 in which the step of heating said metal powder to an elevated temperature to effect a sintering of said metal powder is performed at a temperature ranging from about 2000° F to about 2200° F.

6. The process as defined in claim 1, in which the step of heating said metal powder to an elevated temperature to effect a sintering thereof is performed by employing a first low temperature sintering stage in a vacuum at a temperature ranging from about 1600° F to about 2000° F, followed thereafter by a second sintering stage employing a temperature above that employed in said first sintering stage up to a level below the incipient melting point of the powder particles.

7. The process as defined in claim 1, in which the step of forming a plurality of blade elements is achieved by casting a molten mass of a high temperature strength and fatigue resistant material into a mold cavity of the desired configuration.

8. The process as defined in claim 1, in which the step of forming a plurality of blade elements is performed by sintering at an elevated temperature a finely-particulated powder comprised of a high temperature strength and fatigue resistant material into a coherent substantially dense mass.

9. The process as defined in claim 1, in which the step of forming a plurality of blade elements is performed by heating a finely-particulated powder comprised of a high temperature strength and fatigue resistant metal alloy to a first low temperature sintering stage in a vacuum at a temperature ranging from about 1600° F to about 2000° F, follwed thereafter by a second sintering stage employing a temperature above that employed in said first sintering stage up to a level below the incipient melting point of the powder particles.

10. The process as defined in claim 1, in which the step of forming a plurality of blade elements is performed by employing a high temperature strength and fatigue resistant superalloy.

11. The process as defined in claim 1, in which the step of forming a plurality of blade elements is performed by first forming a ceramic blade section and thereafter sintering a metallic root section to the base of said blade section forming an integral blade element.

12. The process as defined in claim 1, in which the step of hot isostatically pressing said integral assembly is performed at an elevated temperature ranging from 1900° F up to the incipient melting point of the components comprising said assembly.

13. The process as defined in claim 1, in which the step of hot isostatically pressing said integral assembly is performed at a pressure ranging from about 1,000 psi up to the structural limitations of the pressure vessel.

14. A process for making a composite turbine wheel or the like comprising a plurality of blades connected to the periphery of a hub, which comprises the steps of forming a plurality of blade elements composed of a high temperature strength and fatigue resistant material, including a blade section having an integrally-connected root section extending axially of the base of said blade section, finishing said blade elements to accurately final dimensions, forming a hub section by placing a superalloy metal powder of a particle size less than about 100 mesh and an oxygen content of less than about 200 ppm in a mold cavity defining the profile of said hub section and formed with a plurality of accurately spaced notches around the periphery of said hub section, heating said metal powder to an elevated temperature in vacuum to effect a sintering thereof into a coherent mass of at least about 85 percent theoretical density producing a preform, removing said preform from said mold and positioning said blade elements with said root sections thereof in coacting relationship within said notches of said hub section and in radially oriented accurately circumferentially spaced relationship, heating the preliminarily assembled hub and blade sections in vacuum to an elevated temperature until the sintered said hub section attains a density of at least 90 percent of theoretical density and for a period of time to form a metallurgical diffusion bond between said root sections and said hub section forming an integral assembly, and thereafter hot isostatically pressing said integral assembly at an elevated temperature under sufficient pressure for a period of time to effect a further densification of the sintered said hub section to a density approaching 100 percent of theoretical density.

15. The process as defined in claim 14 in which the steps of forming said blade elements and said hub section are performed such that said root sections and said notches upon assembly of said blade elements on said hub section produce a mechanical interlock therebetween.

* * * * *